(12) United States Patent
Ayama et al.

(10) Patent No.: US 8,795,857 B2
(45) Date of Patent: Aug. 5, 2014

(54) PERPENDICULAR MAGNETIC RECORDING MEDIUM AND MANUFACTURING METHOD OF THE SAME

(75) Inventors: Kenji Ayama, Singapore (SG);
Tokichiro Sato, Singapore (SG);
Teiichiro Umezawa, Singapore (SG);
Masafumi Ishiyama, Singapore (SG)

(73) Assignee: WD Media (Singapore) Pte. Ltd., Singapore (SG)

( * ) Notice: Subject to any disclaimer, the term of this patent is extended or adjusted under 35 U.S.C. 154(b) by 17 days.

(21) Appl. No.: 12/665,271

(22) PCT Filed: Sep. 24, 2008

(86) PCT No.: PCT/JP2008/067166
§ 371 (c)(1),
(2), (4) Date: Feb. 4, 2010

(87) PCT Pub. No.: WO2009/041423
PCT Pub. Date: Apr. 2, 2009

(65) Prior Publication Data
US 2010/0196740 A1    Aug. 5, 2010

(30) Foreign Application Priority Data

Sep. 28, 2007   (JP) ................................ 2007-256914

(51) Int. Cl.
*G11B 5/66* (2006.01)

(52) U.S. Cl.
USPC ...................................................... 428/833.2

(58) Field of Classification Search
CPC ............................................................ G11B 5/72
USPC ................................ 428/833.1, 833.2, 833.3
See application file for complete search history.

(56) References Cited

U.S. PATENT DOCUMENTS

| | | | |
|---|---|---|---|
| 4,833,031 A | 5/1989 | Kurokawa et al. | |
| 6,001,446 A | 12/1999 | Nakada et al. | |
| 6,432,563 B1 * | 8/2002 | Zou et al. | 428/826 |
| 6,641,932 B1 * | 11/2003 | Xu et al. | 428/666 |
| 6,781,779 B2 * | 8/2004 | Arita et al. | 360/59 |
| 7,132,177 B2 * | 11/2006 | Mukai | 428/831.2 |
| 8,110,298 B1 * | 2/2012 | Choe et al. | 428/827 |
| 2004/0101716 A1 | 5/2004 | Mukai | |
| 2006/0083952 A1 | 4/2006 | Endou et al. | |
| 2007/0087227 A1 * | 4/2007 | Ma et al. | 428/833.1 |
| 2007/0248843 A1 * | 10/2007 | Wu et al. | 428/827 |
| 2010/0021772 A1 * | 1/2010 | Harkness et al. | 428/847 |

FOREIGN PATENT DOCUMENTS

| | | |
|---|---|---|
| JP | 63-98825 A | 4/1988 |
| JP | 63-281220 A | 11/1988 |

(Continued)

OTHER PUBLICATIONS

Written Opinion 1. dated Mar. 17, 2011 in corresponding Singapore Patent Application No. 200908340-3, 6 pages.

(Continued)

*Primary Examiner* — Holly Rickman

(57) ABSTRACT

A perpendicular magnetic recording medium of the invention is characterized by having, on a disk substrate 110, a soft magnetic layer 14, a magnetic recording layer 22, a continuous layer 24 magnetically continuous in the in-plane direction of the substrate, a blocking layer 25 for blocking shock imposed on the continuous layer, and a medium protective layer 28 containing carbon formed on the blocking layer.

5 Claims, 2 Drawing Sheets

(56) References Cited

FOREIGN PATENT DOCUMENTS

| | | |
|---|---|---|
| JP | 1-273217 A | 11/1989 |
| JP | 10-11734 A | 1/1998 |
| JP | 2006-114182 A | 4/2006 |
| WO | 03/009280 A1 | 1/2003 |

OTHER PUBLICATIONS

Written Opinion 2. dated Nov. 15, 2011 in corresponding Singapore Patent Application No. 200908340-3, 5 pages.
Examination Report dated Aug. 6, 2012 in corresponding Singapore Patent Application No. 200908340-3, 6 pages.

* cited by examiner

PERPENDICULAR MAGNETIC RECORDING MEDIUM AND MANUFACTURING METHOD OF THE SAME

CROSS REFERENCE TO RELATED APPLICATION

This application is a National Stage of International Application No. PCT/JP2008/067166 filed Sep. 24, 2009, which claims priority from Japanese Patent Application No. 2007-256914, filed Sep. 28, 2007, the contents of all of which are incorporated herein by reference in their entirety

TECHNICAL FIELD

The present invention relates to a perpendicular magnetic recording medium installed in a perpendicular magnetic recording system HDD (Hard Disk Drive), etc. and manufacturing method of the medium.

BACKGROUND ART

With increases in capacity of information processing in recent years, various information recording techniques have been developed. Particularly, the areal density of HDD using the magnetic recording technique has continued to increase at an annual rate of almost 100%. Recently, it has been required that 2.5-inch magnetic disks used in the HDD or the like have the information storage capacity exceeding 160 GB per disk, and to respond to such requirements, it is desired to actualize the information recording density exceeding 250 gigabits per square inch.

To achieve the high recording density in magnetic disks used in the HDD, etc. in recent years, perpendicular magnetic recording system magnetic disks (perpendicular magnetic recording disks) have been proposed. In the conventional longitudinal magnetic recording system, easy axis of the magnetic recording layer is oriented in the plane direction of the substrate surface. Meanwhile, in the perpendicular magnetic recording system, easy magnetization axis is adjusted to be oriented in the perpendicular direction to the substrate surface. In the perpendicular magnetic recording system, as compared with the longitudinal recording system, the demagnetizing field (Hd) reduce and the coercive force Hc becomes higher as magnetic grains are finer, and it is thereby possible to suppress the phenomenon of heat fluctuation. The perpendicular magnetic recording system is thus suitable for increasing the recording density.

Further, with such increases in the information recording density, both densities continue to increase i.e. the linear recording density (BPI: Bit Per Inch) in the circumferential direction of the magnetic disk, and the track density (TPI: Track Per Inch) in the radius direction. Further, techniques have been studied to narrow spacings (magnetic spacings) between the magnetic layer of the magnetic disk and Read/Write elements of the magnetic head so as to improve the S/N ratio. The flying height of the magnetic head is 10 nm or less that has been desired in recent years.

With decreases in the flying height of the magnetic head as described above, the possibility has increased that the magnetic head contacts the disk surface by external impact and/or fluctuations in flying. Therefore, the perpendicular magnetic recording disk is provided with a medium protective layer to protect the surface of the magnetic recording layer against being scratched when the magnetic head collides with the perpendicular magnetic recording disk. The medium protective layer is formed of a carbon over coat (COO) i.e. a coat with high hardness by carbon coat. In some medium protective layer coexist hard diamond-like bonding of carbon and soft graphite bonding (for example, Patent Document 1). Meanwhile, another technique is disclosed that a diamond-like bonding protective layer is manufactured by a CVD (Chemical Vapour Deposition) method (for example, Patent Document 2).

Further, to protect the medium protective layer and the magnetic head when the magnetic head collides, a lubrication layer is formed on the medium protective layer. For example, the lubrication layer is formed by applying perfluoropolyether and sintering.

Patent Document 1: Japanese Laid-Open Patent Publication No. H10-11734
Patent Document 2: Japanese Laid-Open Patent Publication No. 2006-114182

DISCLOSURE OF INVENTION

Problems to be Solved by the Invention

As described above, the medium protective layer and lubrication layer are required on the magnetic recording layer, and with increases in the recording density, there is a demand for further narrowing the spacing (gap) between the magnetic head and the magnetic recording layer. Particularly, in the perpendicular magnetic recording media, there are many cases that a soft magnetic layer is formed so as to apply a strong magnetic field in the perpendicular direction to the magnetic recording layer, and the spacing between the magnetic head and the soft magnetic layer further increases. Therefore, it is preferable to thin layers closer to the substrate surface than the soft magnetic layer, particularly, layers closer to the surface substrate than the magnetic recording layer as much as possible.

However, when the medium protective layer is simply thinned using the conventional CVD method as described in Patent Documents 1 and 2, durability of the medium protective layer deteriorates such as wear resistance, impact resistance, etc.

The present invention was made in view of the above-mentioned problem occurring when the medium protective layer is formed, and it is an object of the invention to provide a perpendicular magnetic recording medium provided with a medium protective layer with improvements in durability such as wear resistance, impact resistance, etc. while maintaining the high coercive force.

Means for Solving the Problem

To solve the above-mentioned problem, the inventors of the invention earnestly made studies, and thought that when it is possible to form a medium protective layer harder than the medium protective layer formed by the conventional method, durability can be maintained even in thinning the medium protective layer. As a method of forming a medium protective layer harder than the conventional medium protective layer, a method is considered of increasing the bias voltage to the substrate in the CVD method.

However, in the CVD method, when the bias voltage is increased, there is a problem that the coercive force (Hc) decreases in the magnetic recording medium. The medium protective layer is formed on a continuous layer provided on the magnetic recording layer to increase write performance. Then, when the high bias voltage is applied in forming the medium protective layer by the CVD method, carbon particles collide intensely with the continuous layer with high energy. Therefore, although the hard medium protective layer is formed, the decrease is considered due to partial destruction in the continuous layer that is formed immediately below the medium protective layer to improve write characteristics of the magnetic recording layer.

Thus, the inventors of the invention found out that the medium protective layer can be thinned even in applying the high bias voltage to the substrate when the coercive force (Hc) of the recording medium is prevented from decreasing, and reached completion of the invention.

In other words, to solve the problem, a typical configuration of a perpendicular magnetic recording medium according to the invention is characterized by having, on a substrate, a soft magnetic layer, a magnetic recording layer, a continuous layer magnetically continuous in the in-plane direction of the substrate, a blocking layer for blocking shock imposed on the continuous layer, and a medium protective layer containing carbon formed on the blocking layer.

By the configuration provided with the blocking layer between the continuous layer and the medium protective layer, the blocking layer blocks shock occurring in forming the medium protective layer, and the probability remarkably reduces that the continuous layer directly sustains damage. Accordingly, it is made possible to form a hard medium protective layer while maintaining the high coercive force (Hc), and the medium protective layer can be thinned.

Further, the medium protective layer is preferably formed using a CVD (Chemical Vapour Deposition) method or a sputtering method.

By forming the medium protective layer using the CVD method or sputtering method, it is possible to form the denser medium protective layer containing carbon with higher hardness, and the medium protective layer can be thinned.

Moreover, a bias voltage can be applied to the substrate in forming the medium protective layer. By this means, it is possible to form the dense medium protective layer containing carbon with high hardness. Furthermore, since the blocking layer is provided between the continuous layer and medium protective layer, even when the medium protective layer is formed while applying the high bias voltage to the substrate, the blocking layer blocks shock, the continuous layer does thereby not sustain damage directly, it is made possible to form the hard medium protective layer, and the medium protective layer can be thinned.

Further, the blocking layer may be formed of a nonmagnetic material. By this means, magnetic effects are not imposed on the continuous layer immediately below the blocking layer and the magnetic recording layer, and there is no risk of increasing noise.

Furthermore, the blocking layer may be amorphous. By this means, it is possible to reliably block shock imposed to the continuous layer occurring in forming the medium protective layer using the CVD method or sputtering method.

Still furthermore, the blocking layer may be formed of an element contained in the continuous layer. By this means, it is possible to form the blocking layer suitably without changing properties of the films formed below the continuous layer.

Moreover, the blocking layer may be formed of Cr or a Cr alloy. Cr is nonmagnetic, and therefore, does not have the magnetic effect on the layers below the blocking layer. Further, since Cr has high hardness, it is possible to reliably protect the continuous layer when the thin blocking layer is formed. Furthermore, Cr is bound to C (carbon) constituting the medium protective layer in forming the medium protective layer on the blocking layer, and chromium carbide is produced at the interface between the blocking layer and the medium protective layer. Since chromium carbide has high hardness, higher hardness can be expected as the medium protective layer.

Further, the medium protective layer may contain diamond-like carbon. It is thereby possible to provide the dense medium protective layer with durability.

Furthermore, the continuous layer may contain a Co—Cr alloy. By this means, write performance are improved in the magnetic recording layer.

To solve the above-mentioned problem, a typical constitution of a method of manufacturing a perpendicular magnetic recording medium according to the invention is a method of manufacturing a perpendicular magnetic recording medium having, on a substrate, a soft magnetic layer, a magnetic recording layer, a continuous layer which is magnetically continuous in the in-plane direction of the substrate, and a medium protective layer containing carbon in this order, and is characterized by including the steps of forming, on the continuous layer, a blocking layer for blocking shock that the continuous layer undergoes, and of forming the medium protective layer on the blocking layer.

Structural elements and descriptions thereof based on the technical idea of the perpendicular magnetic recording medium as described above are applicable to the method of manufacturing the perpendicular magnetic recording medium.

Advantageous Effect of the Invention

The perpendicular magnetic recording medium according to the invention is capable of having a medium protective layer with improvements in durability such as wear resistance, impact resistance, etc. while maintaining the high coercive force.

DESCRIPTION OF SYMBOLS

Figure 1:
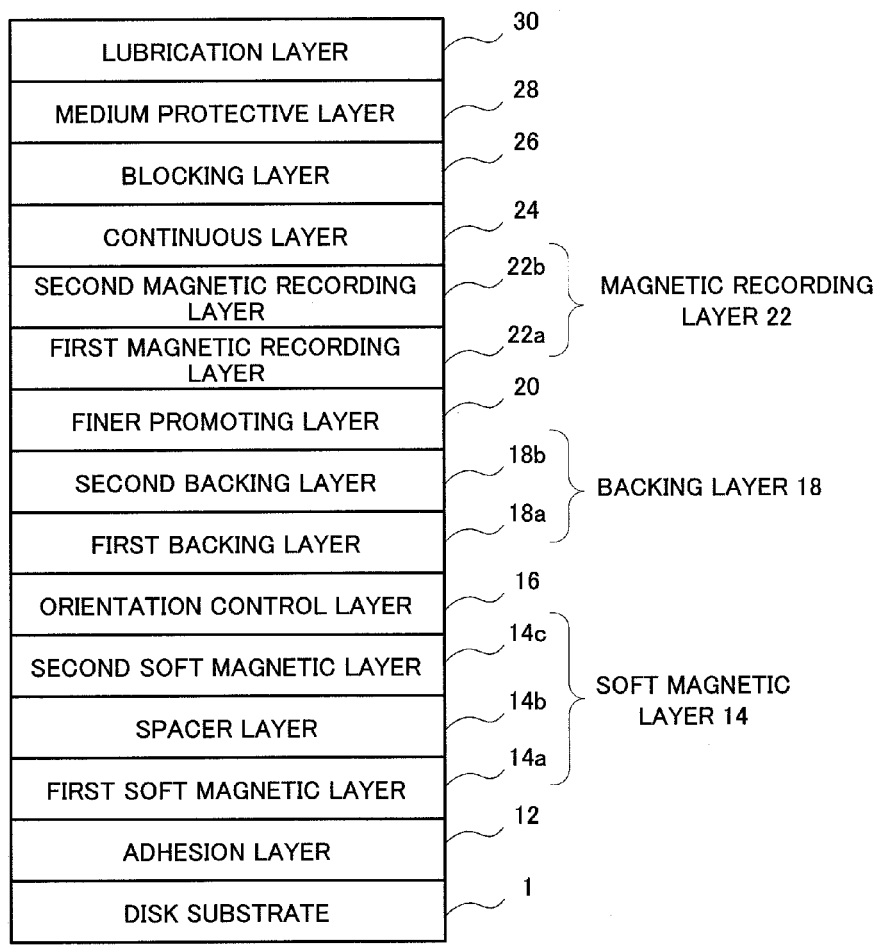
FIG. 1 is a diagram to explain a configuration of a magnetic recording medium according to an Example.

1 Disk substrate
12 Adhesion layer
14 Soft magnetic layer
14a First soft magnetic layer
14b Spacer layer
14c Second soft magnetic layer
16 Orientation control layer
18 Under layer
18a First Underlayer
18b Second Underlayer
20 Finer promoting layer
22 Magnetic recording layer
22a First magnetic recording layer
22b Second magnetic recording layer
24 Continuous layer
26 Blocking layer
28 Medium protective layer
30 Lubrication layer

BEST MODE FOR CARRYING OUT THE INVENTION

Example

Figure 2:
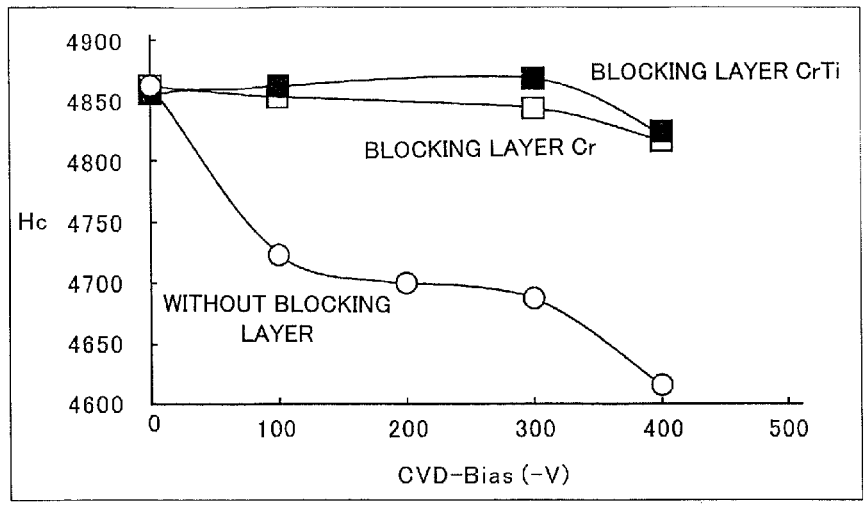
FIG. 2 is a graph illustrating the relationship between a bias voltage and coercive force Hc.
Figure 3:
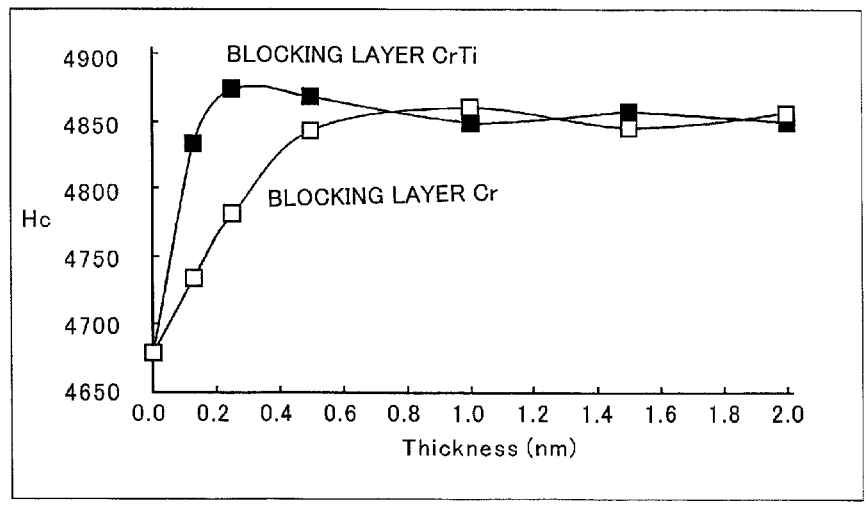
FIG. 3 is a graph illustrating the relationship between a film thickness and coercive force Hc.

Described below is an Example of a perpendicular magnetic recording medium according to the invention. FIG. 1 is a diagram to explain a configuration of the perpendicular magnetic recording medium of the Example, FIG. 2 is a graph illustrating the relationship between a bias voltage and coercive force Hc, and FIG. 3 is a graph illustrating the relationship between a film thickness and coercive force Hc. In addition, dimensions, materials, specific numeric values and others are only illustrative to facilitate understanding of the invention, and the invention is not limited thereto except as otherwise particularly mentioned.

The perpendicular magnetic recording medium as shown in FIG. 1 is comprised of a disk substrate 1, adhesion layer 12, first soft magnetic layer 14a, spacer layer 14b, second soft magnetic layer 14c, orientation control layer 16, first backing layer 18a, second backing layer 18b, finer promoting layer 20, first magnetic recording layer 22a, second magnetic recording layer 22b, continuous layer 24, blocking layer 26, medium protective layer 28 and lubrication layer 30. In addition, the first soft magnetic layer 14a, spacer layer 14b and second soft magnetic layer 14c constitute a soft magnetic layer 14. The first backing layer 18a and second backing layer 18b constitute a backing layer 18. The first magnetic recording layer 22a and second magnetic recording layer 22b constitute a magnetic recording layer 22.

First, amorphous aluminosilicate glass was formed in the shape of disk by direct press, and glass disks were prepared. The glass disk was subjected to grinding, polishing and chemical reinforcement sequentially, and obtained was the smooth nonmagnetic disk substrate 1 made of a chemically reinforced glass disk.

Using a deposition apparatus under vacuum, in an atmosphere of Ar, by a DC magnetron sputtering method, deposition was performed sequentially on the obtained disk substrate 1 from the adhesion layer 12 to the blocking layer 26, and the medium protective layer 28 was formed by a CVD method. Thereafter, the lubrication layer 30 was formed by a dip coat method. In addition, in terms of high in productivity, it is also preferable to use an in-line deposition method. A configuration and manufacturing method of each layer will be described below.

The adhesion layer 12 was formed using a Ti alloy target so that the layer 12 is a Ti alloy layer of 10 nm. By forming the adhesion layer 12, it is possible to enhance adhesion between the disk substrate 1 and soft magnetic layer 14, and it is thereby possible to prevent the soft magnetic layer 14 from peeling off. As a material for the adhesion layer 12, for example, Cr—Ti alloys can be used.

By providing the nonmagnetic spacer layer 14b between the first soft magnetic layer 14a and second soft magnetic layer 14c, the soft magnetic layer 14 is configured to has AFC (Antiferro-magnetic exchange coupling). By this means, it is possible to align the magnetization direction of the soft magnetic layer 14 along the magnetic path (magnetic circuit) with high accuracy, perpendicular components in the magnetization direction are thereby an extremely few, and it is thus possible to reduce noise occurring from the soft magnetic layer 14. More specifically, the compositions of the first soft magnetic layer 14a and second soft magnetic layer 14c were CoFeTaZr, and the composition of the spacer layer 14b was Ru (ruthenium).

The orientation control layer 16 has the function of protecting the soft magnetic layer 14, and the function of promoting alignment of orientation of crystal particles of the backing layer 18. Materials for the orientation control layer can be selected from Ni, Cu, Pt, Pd, Zr, Hf and Nb. Further, using the metals as a main component, alloys containing one or more additive elements of Ti, V, Ta, Cr, Mo and W may be used. For example, it is possible to suitably select NiW, CuW and CuCr.

The backing layer 18 is an hcp structure, and enables crystals of the hcp structure of the magnetic recording layer 22 to grow as a granular structure. Accordingly, as the crystal orientation of the backing layer 28 is higher, the orientation of the magnetic recording layer 22 can be improved. As a material for the backing layer, as well as Ru, it is possible to select from RuCr and RuCo. Ru takes the hcp structure, and enables the magnetic recording layer containing Co as a main component to be oriented excellently.

In this Example, the backing layer 18 has a two-layer structure made of Ru. In forming the second backing layer 18b on the upper layer side, the gas pressure of Ar was made higher than in forming the first backing layer 18a on the lower layer side. Since the free migration lengths of plasma ions to be sputtered are decreased as the gas pressure is increased, the deposition rate is decreased, and the crystal orientation is improved. Further, by increasing the pressure, the size of crystal lattices becomes small. Since the size of the crystal lattice of Ru is greater than that of the crystal lattice of Co, the decreased crystal lattice of Ru approaches the size of the crystal lattice of Co, and it is possible to further enhance crystal orientation of the granular layer of Co.

The finer promoting layer 20 is a nonmagnetic granular layer. The nonmagnetic granular layer is formed on the hcp crystal structure of the backing layer 18, the granular layer of the first magnetic recording layer 22a is developed on the layer 20, and the function is thereby provided of separating the magnetic granular layer from the stage (rising) of the initial growth. The composition of the finer promoting layer 20 was CoCr—$SiO_2$.

The magnetic recording layer 22 is formed of the first magnetic recording layer 22a with a thin film thickness, and the second magnetic recording layer 22b with a thick film thickness.

As the first magnetic recording layer 22a, the hcp crystal structure of CoCrPt—$Cr_2O_3$ of 2 nm was formed using a hard magnetic material target made of CoCrPt containing chromic oxide ($Cr_2O_3$) as an example of nonmagnetic materials. The nonmagnetic material was segregated around the magnetic material to form the grain boundary, and the magnetic grains formed a pillar-shaped granular structure. The magnetic grains developed epitaxial growth continuously from the granular structure of the finer promoting layer.

As the second magnetic recording layer 22b, the hcp crystal structure of CoCrPt—$TiO_2$ of 10 nm was formed using a hard magnetic material target made of CoCrPt containing titanium oxide ($TiO_2$) as an example of nonmagnetic materials. Also in the second magnetic recording layer 22b, magnetic grains formed a granular structure.

Herein, the sputtering gas pressure for the first magnetic recording layer 22a was a high pressure of from 3 Pa to 10 Pa. By thus depositing with high sputtering gas pressure, it was possible to obtain high Hc and Hn. The sputtering gas pressure for the second magnetic recording layer 22b was a low pressure of from 0.6 Pa to 3 Pa. By thus depositing with low sputtering gas pressure, it was possible to obtain high impact resistance.

In this Example, different materials (targets) were used for the first magnetic recording layer 22a and second magnetic recording layer 22b, but the invention is not limited thereto, and materials with same compositions or same kinds may be used. In addition, examples of nonmagnetic materials to form a nonmagnetic area are silicon oxides ($SiO_X$), chromium (Cr), chromic oxides ($CrO_x$), titanium oxide ($TiO_2$), zirconium dioxide ($ZrO_2$) and tantalum pentoxide ($Ta_2O_5$).

As the continuous layer 24, a thin film (auxiliary recording layer) indicating high saturation magnetization Ms and perpendicular magnetic anisotropy was formed on the granular magnetic layer to construct a CGC (Coupled Granular Continuous) structure. By this means, in addition to high-density recording property and low noise of the granular layer, it is possible to add high heat resistance of the continuous film. The composition of the continuous layer 24 was CoCrPtB.

The blocking layer 26 was formed using a CrTi target to be a Cr—Ti alloy layer. The blocking layer 26 is capable of suppressing reductions in Hc occurring in forming the medium protective layer 28 described later using a CVD method. In this Example, the blocking layer 26 was formed of a Cr—Ti alloy, but is not limited thereto, and can be formed suitably also using elements such as Cr alone and Cr alloy contained in the continuous layer 24.

Cr is nonmagnetic, and therefore, does not have the magnetic effect on the layers below the blocking layer 26. Further, since Cr has high hardness, it is possible to reliably protect the continuous layer 24 when the thin blocking layer is formed. Furthermore, Cr is bound to C (carbon) constituting the medium protective layer 28 in forming the medium protective layer 28 described later on the blocking layer 26, and chromium carbide is produced at the interface between the blocking layer 26 and the medium protective layer 28. Since chromium carbide has high hardness, higher hardness can be expected as the medium protective layer 28. Further, since Cr or CrTi is amorphous, it is possible to reliably block shock imposed on the continuous layer 24 occurring in forming the medium protective layer 28 using a CVD method. Furthermore, since Cr is inexpensive, it is possible to reduce manufacturing cost.

The medium protective layer 28 was formed by depositing carbon by a CVD method with the vacuum kept, and formed while containing diamond-like carbon. The medium protective layer 28 is a protective layer to protect the perpendicular magnetic recording layer from shock of a magnetic head. In this Example, the medium protective layer 28 was deposited using the CVD method, but is not limited thereto, and may be deposited using a sputtering method. Further, when the medium protective layer 28 is formed, by increasing the bias voltage applied to the disk substrate 1, it is possible to enhance film hardness.

Herein, the relationship between the bias voltage and Hc in a CVD method is described with reference to FIG. 2. As shown in FIG. 2, in the case that the blocking layer 26 is not provided, Hc abruptly decreases when the bias voltage is increased. Meanwhile, in the case that the blocking layer 26 is provided, increases in the bias voltage hardly affect Hc.

Accordingly, even when the medium protective layer 28 is formed using a CVD method while applying a high bias voltage, since the blocking layer 26 blocks shock, the probability remarkably decreases that the continuous layer 24 directly sustains damage. Accordingly, it is possible to form the hard medium protective layer 28 while maintaining the high coercive force (Hc), and the medium protective layer can be thinned.

Herein, the relationship between a film thickness of the blocking layer 26 and Hc is described with reference to FIG. 3. As shown in FIG. 3, when the blocking layer 26 is formed of CrTi, as the film thickness is increased, Hc increases. The maximum value of Hc is obtained when the film thickness is 0.25 nm, and Hc is kept almost constant when the film thickness is further increased. Meanwhile, when the blocking layer 26 is formed of Cr, as the film thickness is increased, Hc increases. The maximum value of Hc is obtained when the film thickness is 0.5 nm, and Hc is kept almost constant when the film thickness is further increased.

As described, in the blocking layer 26, it is possible to maintain Hc in a thickness of about 0.25 nm in the case of CrTi and in a thickness of about 0.5 nm in the case of Cr. Thus, only by providing the extremely thin blocking layer 26 of 1 nm or less, it is possible to prevent Hc from decreasing, and it is thereby possible to minimize an increase in the distance between the magnetic head and the magnetic recording layer 22 even when the blocking layer 26 is provided. Further, since the medium protective layer 28 can be made hard, it is possible to thin the medium protective layer 28, and contribute to increases in recording density by shortening the distance between the magnetic head and magnetic recording layer 22.

The lubrication layer 30 was formed by a dip coat method using PEPE (perfluoropolyether). The film thickness of the lubrication layer 30 was about 1 nm.

In the foregoing, the preferable example of the invention is described with reference to accompanying drawings, but the invention is certainly not limited to the Example. It is obvious that a person skilled in the art can arrive at various changes and modifications within the scope of claims of the invention, and it is understood that the changes and modifications belong to the technical scope of the invention.

INDUSTRIAL APPLICABILITY

The invention is applicable as a perpendicular magnetic recording medium installed in a perpendicular magnetic recording system HDD (Hard Disk Drive), etc.

The invention claimed is:
1. A perpendicular magnetic recording medium comprising:
   a substrate;
   a soft magnetic layer disposed above a surface of the substrate;
   a magnetic recording layer disposed above the soft magnetic layer;
   a continuous layer which is magnetically continuous in the in-plane direction of the substrate disposed above the magnetic recording layer;
   a blocking layer disposed above the continuous layer and CVD (Chemical Vapour Deposition) deposited directly on the continuous layer to have a thickness of approximately 0.25 nm for blocking shock imposed on the continuous layer when carbon atoms are applied during formation of a medium protective layer; and
   the medium protective layer containing carbon and formed on the blocking layer,
   wherein the blocking layer is non-magnetic and formed only of amorphous CrTi, and
   wherein the medium protective layer is formed on the blocking layer while a bias voltage of 100 V to 300 V is applied to the substrate.

2. The perpendicular magnetic recording medium according to claim 1, wherein the medium protective layer is formed using a CVD (Chemical Vapour Deposition) method or a sputtering method.

3. The perpendicular magnetic recording medium according to claim 1, wherein the blocking layer is formed of an element contained in the continuous layer.

4. The perpendicular magnetic recording medium according to claim 1, wherein the medium protective layer contains diamond-like carbon.

5. The perpendicular magnetic recording medium according to claim 1, wherein the continuous layer contains a Co—Cr alloy comprising CoCrPtB.

\* \* \* \* \*